United States Patent [19]

Ueno et al.

[11] Patent Number: 5,208,831
[45] Date of Patent: May 4, 1993

[54] NETWORK INTERFACE SYSTEM

[75] Inventors: Masaji Ueno, Tokyo; Akihito Nishikawa, Kanagawa; Shinichi Iida; Hajime Shiraishi, both of Tokyo, all of Japan

[73] Assignee: Kabushiki Kaisha Toshiba, Kanagawa, Japan

[21] Appl. No.: 829,534

[22] Filed: Feb. 3, 1992

Related U.S. Application Data

[63] Continuation of Ser. No. 604,480, Oct. 26, 1990, abandoned.

[30] Foreign Application Priority Data

Oct. 26, 1989 [JP] Japan .................. 1-277197

[51] Int. Cl.⁵ .............................. H04L 7/08
[52] U.S. Cl. ...................... 375/7; 331/1 R; 375/120
[58] Field of Search ............ 375/4, 82, 106, 107, 375/108, 113, 119, 120, 7, 8; 370/84, 105.3, 110.1; 331/1 R, 1 A, 76

[56] References Cited

U.S. PATENT DOCUMENTS

| | | | |
|---|---|---|---|
| 4,330,855 | 5/1982 | Redfern et al. | 370/100.1 |
| 4,344,039 | 8/1982 | Sugiura et al. | 375/82 |
| 4,534,044 | 8/1985 | Funke et al. | 375/120 |
| 4,849,993 | 7/1989 | Johnson et al. | 375/108 |
| 4,953,163 | 8/1990 | Miyamoto et al. | 375/120 |

Primary Examiner—Benedict V. Safourek
Attorney, Agent, or Firm—Finnegan, Henderson, Farabow, Garrett & Dunner

[57] ABSTRACT

It is an object of this invention to provide a novel network interface system which is able to connect automatically to the respective network stations having different data transfer speeds, in order to avoid the above problems. According to this invention, there is provided a detector and a selector in the communication interface to automatically select the appropriate data transfer speed. In the above structure, the speed of communication data transferred by a network is one of two detected by the detector which is able to detect a transfer speed and provide outputs at a first level signal when the transfer speed is at one level and outputs a second level signal when it is at a second level. The selecting means selects the frequency to connect a network station in response to the signal output from the detector. As a result, users need not select the module by themselves, the system automatically select the module.

11 Claims, 5 Drawing Sheets

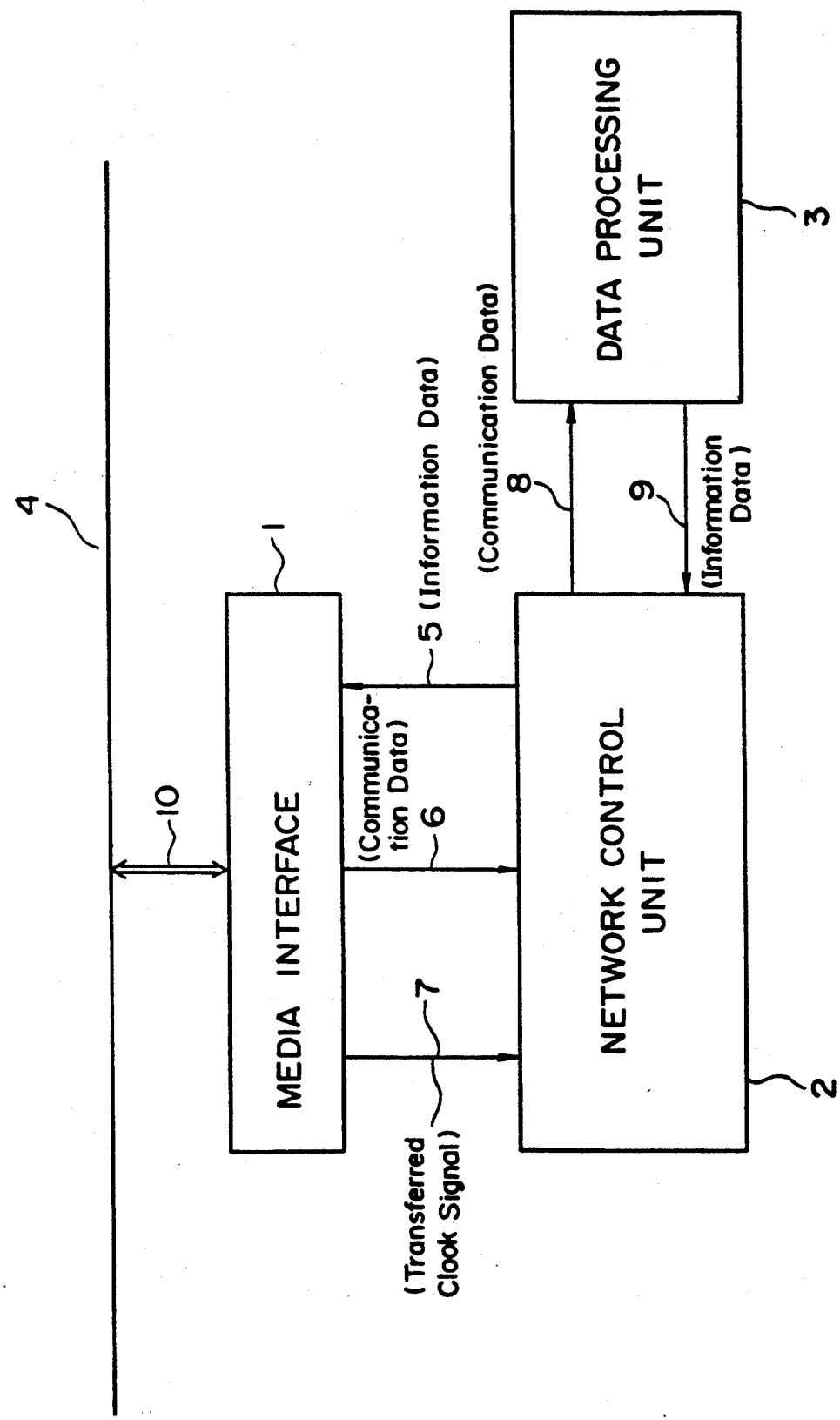
FIG. 1
(CONVENTIONAL)

NETWORK INTERFACE SYSTEM

This application is a continuation of application Ser. No. 07/604,480, filed Oct. 26, 1990, now abandoned.

BACKGROUND OF THE INVENTION

1. Field of the Invention

This invention relates to a network interface system, in particular to those networks having respective the different speeds for the transfer of data.

2. Description of the Related Art

A token ring local area network (LAN) is a data communications system connected in a one-way signal path.

As to an access means of the data communications system, there are three common types of data transmission networks which are the CSMA/CD (EThernet) for IEEE 802.3, the token bus, and the token ring. Among these three types, only the token ring has two data transferred speeds, 4 Mbps and 16 Mbps (Mega Bits Per Second). Both of the transfer speeds are frequently used, and often the data transferred speed of 4 Mbps is used in one network while the data transfer speed of 16 Mbps is used in another network, both of which a user may wish to access.

FIG. 1 shows a conventional data communications system. In FIG. 1, a communication interface 1 is connected to of an analogue circuit. The interface 1 changes the network data transferred by network 4 into a digital signal as communication data. It concurrently generates a synchronizing clock signal 7 for transfer of the communication data. A network control unit 2 receives the communication data using the synchronizing clock signal 7 and the network control unit 2 transfers the communication data to the user unit, here shown as a data processing unit 3. On the other hand, information data generated by the data processing unit 3 is output to the network control unit 2. This information data is changed to an analogue output signal by the communication interface 1 in order to output it to the network 4.

FIG. 2 shows the details of the communication interface 1 shown in FIG. 1. The interface 1 includes a first module 21 for 4 Mbps data transfer and a second module 22 for 16 Mbps data transfer, which respectively have a switch 23, 24 for connecting to the network cable 4, an amplifier 25, 26 for amplifying the communication data transferred from the network 4 through the switch 23, 24, and a VCO (voltage controlled oscillator) controller 35, 36. Each VCO controller 35, 36 has a comparator 27, 28, a charge pump 29, 30 and low-pass filter 31, 32, for adjusting the phase difference between the synchronizing clock signal and the basic clock signal output of VCO 33, 34. The VCO 33, 34 generates the basic clock signal in response to the output of the VCO controller 35, 36. Both modules have a crystal oscillator located in the VCO 33, 34. The first module 21 for 4 Mbps data transfer has a 8 MHz crystal oscillator, and the second module 22 for 16 Mbps data transfer has a 32 MHz crystal oscillator. One of the modules must be selected by the user before the data communications system is connected to the network 4 so that the data communications system is synchronized with the frequency of the communication data transferred by the network 4. It is possible to select one module by means of making either switch 23 or switch 24 conductive in response to register 37 controlled by CPU 38. The clock signal generated by the selected module is also outputted to a data transmitter 39, a data receiver 40 and the network control unit 2 by way of a switch 29.

The communication interface of prior system has the following drawbacks.

First, the user needs to know the speed of the transferred data from the other network stations before the data communications system is connected to other network stations.

Second, the stations must have two modules for 4 Mbps and 16 Mbpsdata transfer respectively. As a result, much space is required. In a portable computer, for example for a Lap Top Computer, this is a serious problem which results in bigger and heavier unit.

Finally even if both modules are incorporated into an integrated circuit, there is no automatic selection of data transfer speed.

SUMMARY OF THE INVENTION

Accordingly, it is an object of this invention to provide a novel network interface system which is able to connect automatically to the respective network stations having different data transfer speeds, in order to avoid the above problems. According to this invention, there is provided a detector means and a selecting means in the communication interface to automatically select the appropriate data transfer speed. In the above structure, the speed of communication data transferred by a network is one of two detected by the detective means which is able to detect to the transferred speeds and provide outputs at a first level signal when the transfer speed is at one level and outputs a second level signal when it is at a second level. The selecting means selects the frequency to connect a network station in response to the signal output from the detector means.

As a result, users need not select the module by themselves, the system automatically select the module.

BRIEF DESCRIPTION OF THE DRAWINGS

FIG. 1 is a block diagram of a conventional communication station system;

DETAILED DESCRIPTION WITH REFERENCE TO THE DRAWINGS

Figure 2:
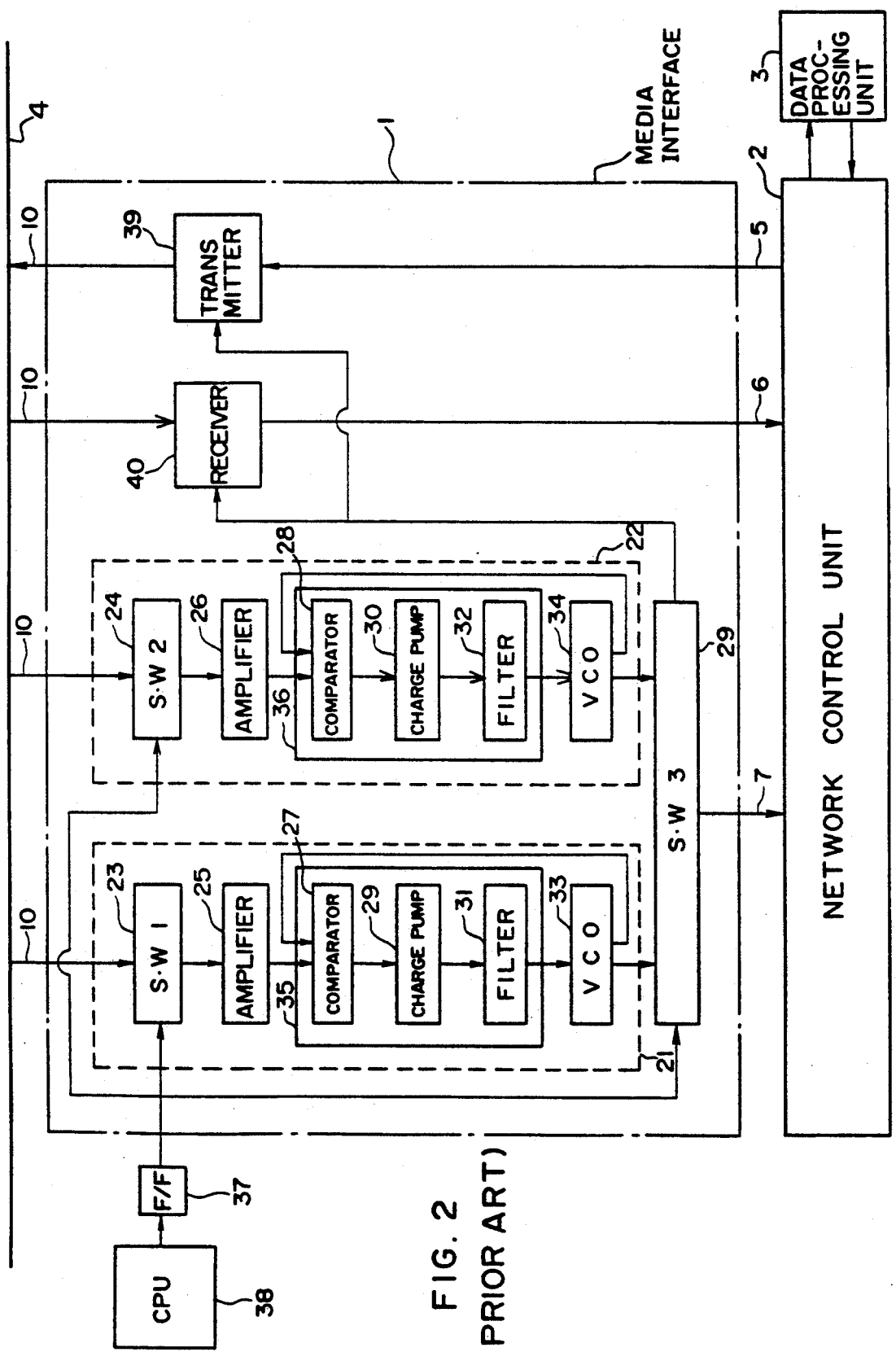
FIG. 2 is a block diagram of the communication interface shown in FIG. 1.
Figure 3:
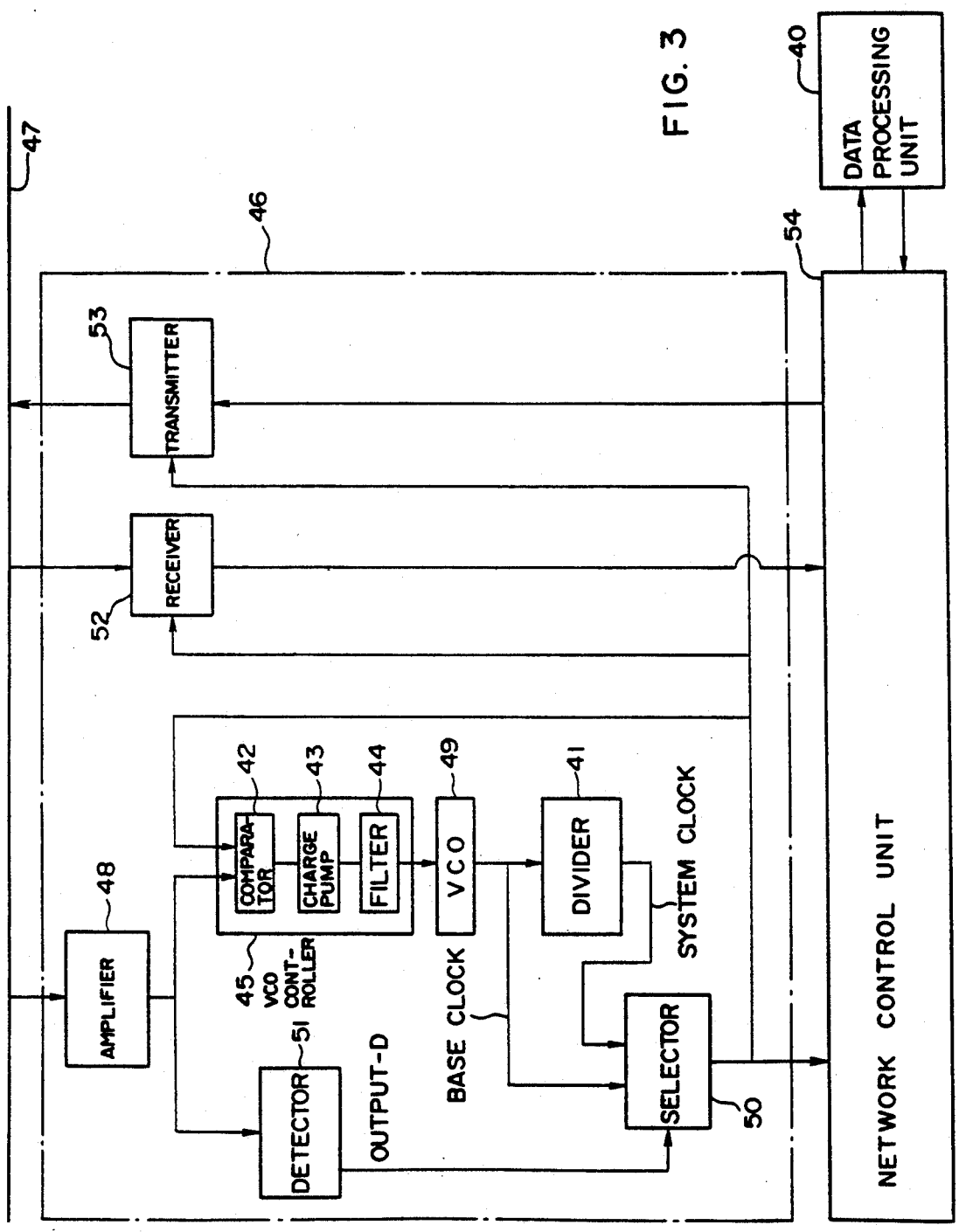
FIG. 3 is a block diagram illustrating a preferred embodiment of the communication interface according to the present invention.

The preferred embodiment of the invention is described below with reference to the drawings. FIG. 3 shows a block diagram illustrating one embodiment of the communication interface 46 according to the present invention.

The communication interface 46 is included in a network station connected to a token ring LAN (Local Area Network). The interface 46 includes an amplifier 48 for amplifying the communication data transferred from a network 47 to each network station, a voltage controlled oscillator (VCO) 49 for generating a basic clock signal, a frequency divider 41 for outputting a system clock signal, a selector 50 for selecting the basic clock signal or the system clock signal in response to an output signal of detector 51. Furthermore the communication interface 46 includes receiver 52 which receives communication data from the network 47 and outputs the communication data to a network control unit 54, by synchronizing a clock signal output using the selector 50. A transmitter 53 transfers an information data output by the network control unit 54 to the network 47, by synchronizing the clock signal output by using the selector 50. The network control unit 54 provides communication data to the data processing unit 40. The information data generated by the data processing unit 40 is transmitted via network control unit 54 to the transmitter 53. This network control unit 54 changes the communication data to the information data, and outputs it to the data processing unit 40. Furthermore, the unit 54 changes the information data using the clock signal of the data processing unit 40 with the clock signal selected by the selector 50. The signal is outputted to the transmitter 53. The communication data and the digital data is synchronized by the clock signal output of the selector 51.

The communication data on network 47 is provided to the detector 51 which has a data D output. The selector 50 selects either base clock signal generated by the voltage controlled oscillator 49 or the system clock signal generated by the frequency divider 41. The frequency of the clock signal output from selector 50 is 32 MHz when the data transfer speed of the network is 16 Mbps (Mega Bit Per Second). If the dividing rate of the frequency divider 41 is set at 4, the clock signal of 32 MHz is divided by 4. As a result, the system clock signal output is 8 MHz. New clock signal output of selector 50 is compared with the communication data output of amplifier 48 by comparator 42. VCO controller 45 includes comparator 42 adjusting the phase difference. Comparator 42 outputs an output signal according to the phase difference between two signals. The one signal is a synchronizing clock signal generated by the amplifier 48, the other is the clock signal selected by the selector 50. The output of comparator 42 is provided as a voltage for controlling VCO 49, through a charge pump circuit 43 for charging up the output of the comparator 42 and a low-pass filter 44. The alternating current output is changed to a direct current by the charge pump circuit 43 and the low-path filter 44.

On the other hand, the data transmitter 53 transfers the information data output by the data processing unit 40 to the network 47 at a data transferred speed based on the frequency selected by selector 50.

Figure 4:
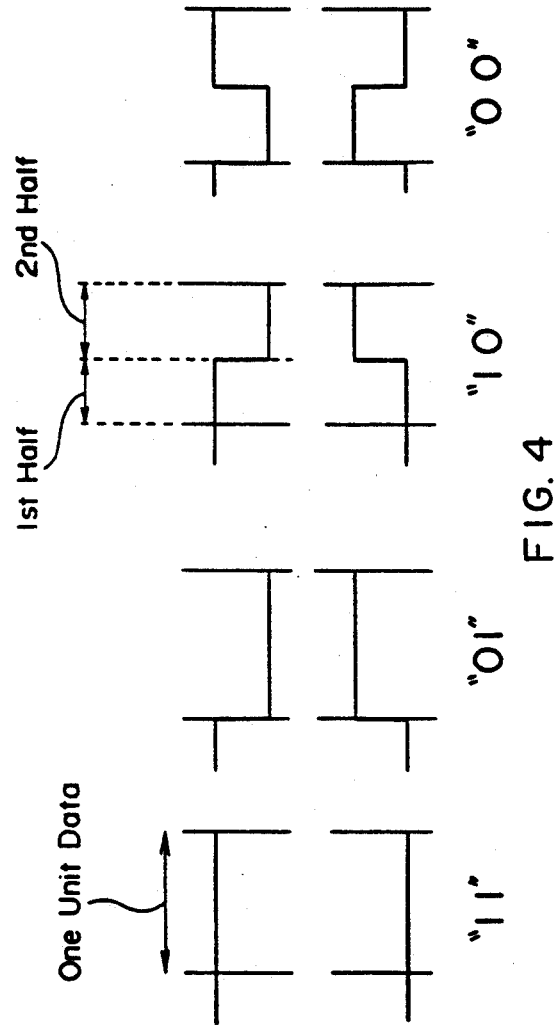
FIG. 4 is a waveform diagram for explaining a differential Manchester code.

A differencial manchester code (DM code) is adopted in the token ring LAN. The format of one unit data of the DM code, shown in FIG. 4, is divided into a first half and a second half. The one unit data of the transfer data is expressed as two bits. The bit data of the first half and the bit data of the second half are compared and the DM code has four states based on the combination of inversion or non-inversion. Namely, the DM code represents "11", "01", "10" and "00" as the expression of binary numbers on shown in FIG. 4. Furthermore, the communication data has the SD (Start Delimiter) to determine the start of the communication data. For example, "11 01 00 01 00 00 00" is added at the front of the communication data. As a result it is possible to prevent to recognize the data of the second half of one unit data from data of the first half of the next one unit data.

Figure 5:
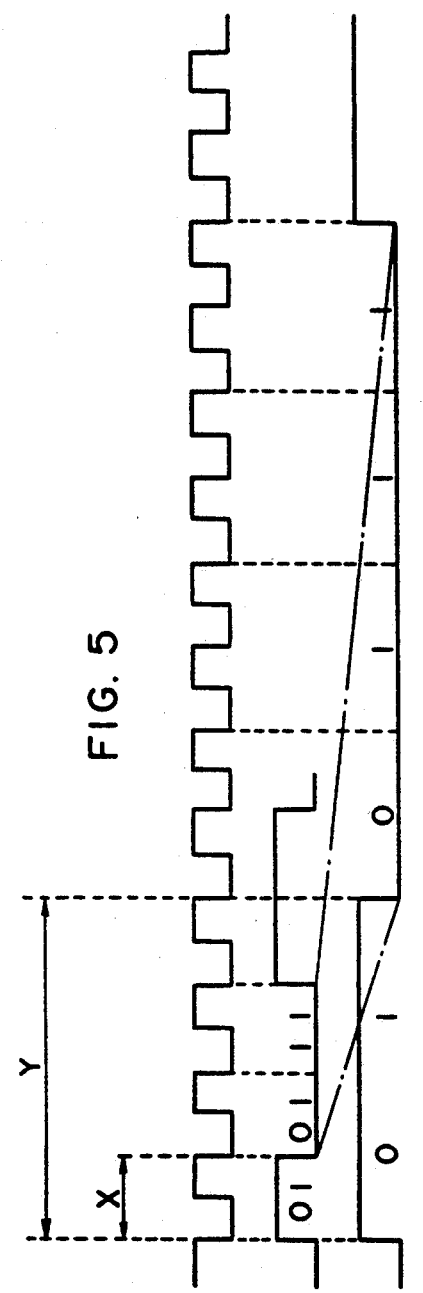
FIG. 5 is a waveform diagram for explaining the operation of the detector shown in FIG. 4.

FIG. 5 is a timing chart showing a synchronizing signal (a) and the data codes of two data transfer signals (b), (c). The frequency of the synchronizing signal is the frequency of the base clock signal generated by the VCO 49. Namely, it is 32 MHz. The data code (b), (c) uses the DM Code. When the transfer speed of the communication data is 16 Mbps, the period of the data code (b) becomes twice the period of the synchronizing signal. Also, when the transfer speed of the communication data is 4 Mbps, the period of the data code (c) becomes four times the period of the synchronizing signal. The data illustrated by the data code (b) is the same the data as the data code (c). Accordingly, the amplifier 48 receives data at one of the transfer speeds. Assuming period X is the period for one unit data of 16 Mbps, the synchronizing signal (a) rises one time during period X. Assuming period Y is the period for one unit data of 4 Mbps, the synchronizing signal (a) rises four times during period Y. The ratio of X to Y is 1 to 4. Accordingly, detector 51 detects the speed of the communication data by detecting the number of times the synchronizing signal rises to "H" level signal during a certain period (i.e. during the period of one unit data). The selector 50 outputs a clock signal selected from the base clock signal or system clock signal in response to the output D of the detector 51. That is, the selector 50 selects and outputs the 32 MHz clock signal when the transfer speed selected by the detector 51 is 16 Mbps, and the 8 MHz clock signal when the speed is 4 Mbps. The clock signal of 32 MHz or 8 MHz is then provided to the comparator 42, and the comparator 42 compares the output of selector 50 and amplifier 48, and adjusts the phase difference of each signals. As described above, according to the preferred embodiment of this invention, by using a network terminal that includes the communication interface system of this invention, the transfer speed of the LAN network is detected, and the speed to transfer the data to the data processing unit and to the other network is automatically determined in response to the output of the detector 51. Therefore, users need not to know the transfer speed of the LAN network in advance, and users are able to access and transfer data back and forth to a network which is operating at one of two speeds.

Figure 6:
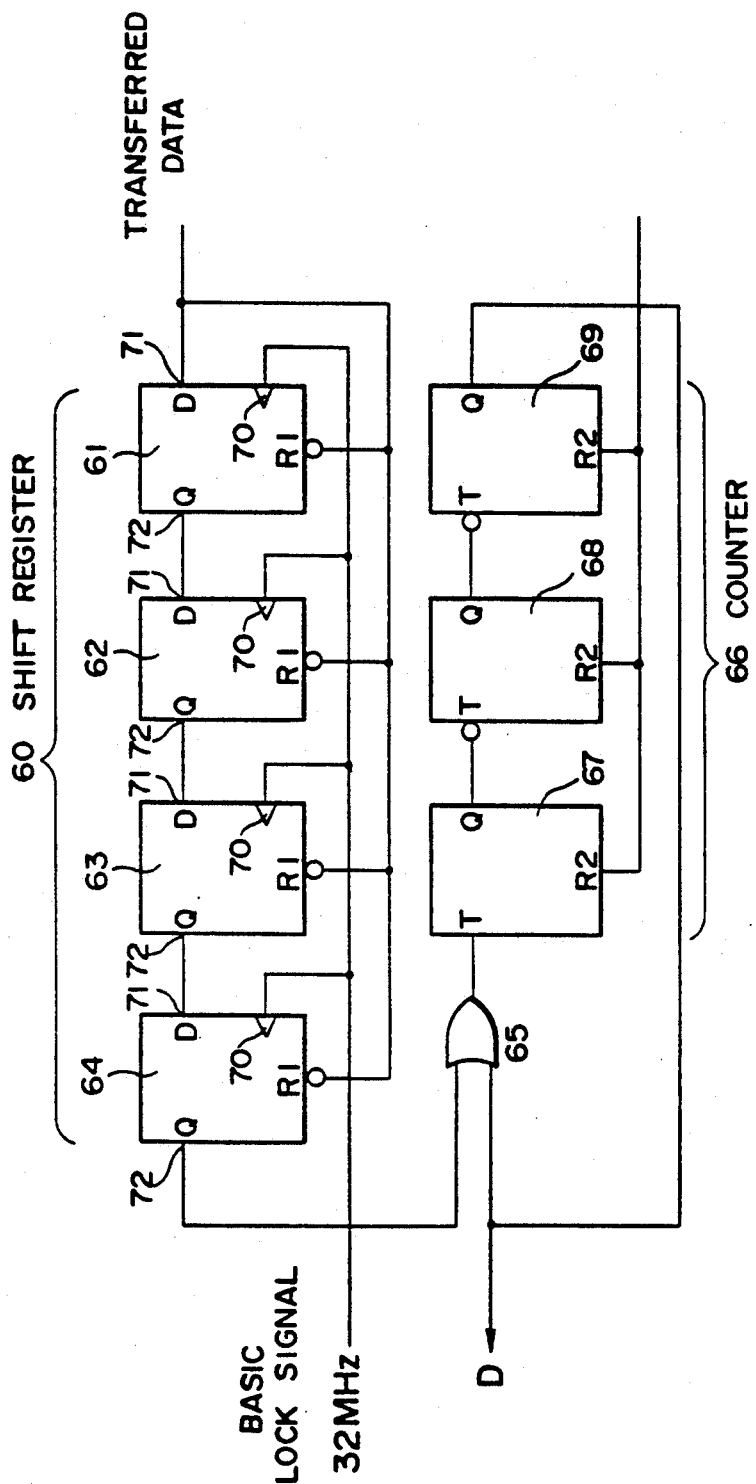
FIG. 6 is a block diagram of a preferred embodiment of the detector shown in FIG. 3.

FIG. 6 shows the details of the preferred embodiment of detector 51 for detecting the transfer speed. This circuit includes a shift register 60 consisting of four serially connected D type flip-flops 61, 62, 63, 64, an OR-gate 65 and a counter 66 consisting of three serially connected T type flip-flops 67, 68, 69.

Each of the D type flip-flops 61, 62, 63, 64 includes a clock input terminal 70 to which is applied the basic clock signal (32 MHz) generated by the VCO 49, a first reset terminal R1 to which is applied the communication data transferred by amplifier 48 from the network, and a data input terminal D 71 and a data output terminal Q 72 which allow the transfer data to shift through the register. The output of the shift register 60 is connected to the OR-Gate 65, and the output of the OR-Gate 65 is provided to first T type flip-flop 67. The output of the third T type flip-flop 69 is connected to the OR-Gate 65 and the selector 50 as output D of the detector 51 (FIG. 3). The three T type flip-flops have a second reset terminal R2 to which a reset signal RS from an external circuit (not shown in) is applied.

The operation of the circuit of FIG. 6 will now be explained. The reset signal RS is applied to the several reset terminals R2 of the three T type flip-flops 67, 68, 69. Next, when the communication data provided by the amplifier 48 is a "H" level signal, the state of the its reset is removed. While the transfer data is "H", if the base clock signal rises four times to "H" level signal, the output Q of the final D type flip-flop 64 outputs a "H" level signal. When the "H" level signal is provided to the counter 66 via the OR-Gate 65, the first T type flip-flop 67 is "H" level signal. Therefore, when the first T type flip-flop 67 in the reset is the state of the reset, this flip-flop 67 outputs the "L" level signal, however, the flip-flop 67 outputs the "H" level signal because the "H" level signal provided by the OR-Gate is input. After these shifts of the register 60, the final T type flip-flop outputs a "H" level signal, and the D output stays at a "H" level signal.

In this case, it is understood that the speed of the transferred data of the LAN network being connected to the terminal is 4 Mbps. An other hand, if while the transfer data code is "H", if the base clock signal rises up only one time, the final D type flip-flop keep to output the "L" signal because the all D type flip-flops are reset if the data code changes "H" to "L" while the base clock signal rises up four times. In this case, it is understood that the speed of the transferred data of the LAN network being connected to the terminal is 16 Mbps. Also, this system defaults to 16 Mbps if the station is not connected to any networks yet.

Furthermore, according to this structure, the counter 66 counts up the output of shift register 60 several times for the purpose of preventing a missed operation.

Figure 7:
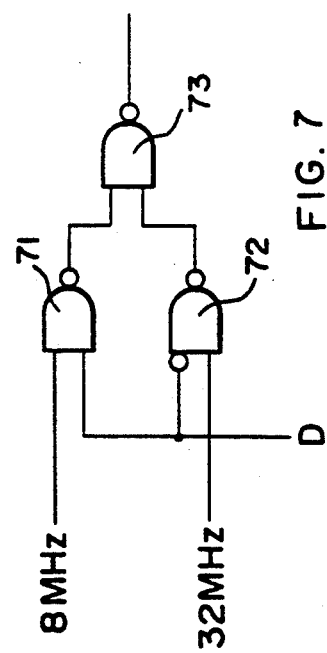
FIG. 7 is a circuit diagram of the selector shown in FIG. 3.

FIG. 7 shows a preferred embodiment of a selector circuit. The selector circuit 50 includes a first NAND-Gate 71 which receives the divided base clock signal D of the detector 51 at the second terminal. A second NAND-Gate 72 has a first terminal connected to VCO 49 inverted output signal D applied to a second terminal. A third NAND-Gate 73 received the output of the first and second NAND-Gates. The system clock signal (8 MHz) is output when the output signal D is "H", and when the output signal D is "L", the base clock signal (32 MHz) is output by the circuit. As described above, with this invention, the communicated interface system can provide a terminal which automatically connects to any network having one of two data transfer speeds. Various modifications and variations could be made to the invention without departing from the scope or spirit the invention.

What is claimed is:

1. A communications network interface system comprising:
   means for receiving a network clock signal from a communications network at one of a plurality of predetermined frequencies;
   means for amplifying the network clock signal received from the communications network and for generating an amplified signal;
   detecting means, responsive to the amplified signal, for generating a detection signal to indicate which one of the plurality of preferred frequencies corresponds to the network clock signal received by the receiving means;
   means, having a first input coupled to the amplified signal and a second input, for generating a voltage in accordance with a phase difference between the amplified signal on the first input and a signal on the second input;
   a voltage controlled oscillator, responsive to the voltage generated by the voltage generating means, for generating a first clock signal at one of the plurality at predetermined frequencies;
   means for dividing the first clock signal to generate a second clock signal at another one of the plurality of preferred frequencies; and
   means, responsive to the detection signal, for selecting one of the first clock signal and the second clock signals to generate a selected clock signal, and for applying the selected clock signal to the second input of the voltage generating means.

2. A network interface system according to claim 1, wherein said detecting means comprises a shift register; and a counter responsive to the shift register.

3. A network system according to claim 1, further comprising:
   a network controller for receiving signal data from the network and for transmitting to the network in synchronism with the clock signal selected by the selector, and
   a data processing unit connected to the network controller for processing the signal data.

4. A network interface system according to claim 1, wherein the detecting means comprises:
   means for detecting the number of pulses of the first clock signal that occur in a period from a rising edge to the next falling edge of the network clock signal; and
   means for counting the number of said pulses, and wherein said detecting means generates the detection signal in accordance with the number of pulses.

5. A network system according to claim 1, further comprising:
   a network controller;
   a data processing user unit connected to the network controller for processing signal data from said controller and outputting information data to said controller;
   wherein said network controller receives signal data transferred from the network and transmits information data from said user unit to said network synchronized in accordance with the selected clock signal.

6. A communications network interface system comprising:
   means for receiving a network clock signal from a communications network at one of the plurality of predetermined frequencies;
   means, responsive to the receiving means, for generating a detection signal to indicate which one of the plurality of preferred frequencies corresponds to the network clock signal received by the receiving means;
   means, having a first input coupled to the receiving means and a second input, for generating a voltage in accordance with a phase difference between a network clock signal on the first input and a signal on the second input;
   means for generating a first clock signal having a frequency that corresponds to one of the plurality of predetermined frequencies and that varies in accordance with the voltage generated by the voltage generating means;
   means, responsive to the clock signal generating means, for generating a divided clock signal that corresponds to another one of the plurality of predetermined frequencies; and means, responsive to the detection signal, for selecting one of the first clock signal and the divided clock signal, and for applying the selected signal to the second input of the voltage generating means.

7. A network interface system according to claim 6, wherein the voltage generating means includes
a shift register; and
a counter responsive to the shift register.

8. A network system according to claim 6, further including
means for receiving a data signal from the network in synchronism with the selected signal.

9. A network system according to claim 8, further including
means for transmitting a data signal to the network in synchronism with the selected signal.

10. A network interface system according to claim 6, wherein the frequency detection signal generating means includes
means for detecting the number of pulses of the first clock signal that occur in a period from a rising edge to the next falling edge of the network clock signal received from the network; and
means for counting the number of pulses.

11. A network interface system according to claim 6, wherein the voltage generating means includes a filter having a filter output voltage, and
wherein the first clock signal generating means is responsive to the filter output voltage regardless of the detection signal.

* * * * *

UNITED STATES PATENT AND TRADEMARK OFFICE
CERTIFICATE OF CORRECTION

PATENT NO. : 5,208,831
DATED : May 04, 1993
INVENTOR(S) : Masaji Ueno et al.

It is certified that error appears in the above-indentified patent and that said Letters Patent is hereby corrected as shown below:

On title page, item [57] Abstract; line 16-18, delete in their entirety and substitute therefor --detector means. As a result, the system automatically selects a module and a user need not select a module.--

Signed and Sealed this

Fifth Day of July, 1994

*Attest:*

BRUCE LEHMAN

*Attesting Officer*  *Commissioner of Patents and Trademarks*